(12) United States Patent
Ichikawa et al.

(10) Patent No.: US 10,631,135 B2
(45) Date of Patent: Apr. 21, 2020

(54) INFORMATION PROCESSING DEVICE, INFORMATION PROCESSING SYSTEM, AND INFORMATION PROCESSING METHOD

(71) Applicant: FUJITSU LIMITED, Kawasaki-shi, Kanagawa (JP)

(72) Inventors: Shizuko Ichikawa, Ota (JP); Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/917,913

(22) Filed: Mar. 12, 2018

(65) Prior Publication Data

US 2018/0270623 A1 Sep. 20, 2018

(30) Foreign Application Priority Data

Mar. 15, 2017 (JP) .................. 2017-050260

(51) Int. Cl.
*H04W 4/00* (2018.01)
*H04W 4/06* (2009.01)
(Continued)

(52) U.S. Cl.
CPC .......... *H04W 4/06* (2013.01); *H04L 67/1008* (2013.01); *H04L 67/1029* (2013.01); *H04L 67/1034* (2013.01); *H04L 67/327* (2013.01); *H04W 4/40* (2018.02); *H04W 4/46* (2018.02); *H04W 84/005* (2013.01)

(58) Field of Classification Search
CPC ..... H04W 80/04; H04W 84/12; H04W 88/06; H04W 88/08
See application file for complete search history.

(56) References Cited

U.S. PATENT DOCUMENTS

2007/0016663 A1* 1/2007 Weis ................... G06F 11/2028
709/223
2010/0074236 A1 3/2010 Takeda et al.
(Continued)

FOREIGN PATENT DOCUMENTS

| JP | 07-056838 | 3/1995 |
| JP | 2000-099435 | 4/2000 |

(Continued)

*Primary Examiner* — Siren Wei
(74) *Attorney, Agent, or Firm* — Fujitsu Patent Center (57) ABSTRACT

An information processing method executed by a first information processing device which is a candidate of a distribution source of data to a terminal and which moves to be associated with a first wireless access point, the information processing method including: obtaining state information on a second information processing device; determining an information processing device that continuously distributes data to a terminal from among the first information processing device and the second information processing device, in accordance with state information on the first information processing device and the state information on the second information processing device obtained in the obtaining; and distributing data to a terminal through the first wireless access point and a second wireless access point associated with the second information processing device when the first information processing device is determined in the determining.

10 Claims, 5 Drawing Sheets

(51) Int. Cl.
*H04L 29/08* (2006.01)
*H04W 4/46* (2018.01)
*H04W 84/00* (2009.01)
*H04W 4/40* (2018.01)

(56) References Cited

U.S. PATENT DOCUMENTS

| | | | | |
|---|---|---|---|---|
| 2010/0150170 A1* | 6/2010 | Lee | ............ | H04L 41/0213 |
| | | | | 370/466 |
| 2011/0275378 A1* | 11/2011 | Kwon | ............ | H04W 72/00 |
| | | | | 455/437 |
| 2015/0372911 A1* | 12/2015 | Yabusaki | ............ | H04L 67/34 |
| | | | | 709/226 |
| 2016/0381699 A1* | 12/2016 | Rubin | ............ | H04L 1/0027 |
| | | | | 370/329 |

FOREIGN PATENT DOCUMENTS

| | | |
|---|---|---|
| JP | 2000-324121 | 11/2000 |
| JP | 2010-098713 | 4/2010 |

* cited by examiner

| VEHICLE ID | WIRELESS RELAY DEVICE ID | INFORMATION PROCESSING DEVICE ID | STATE INFORMATION ||||| DETERMINATION RESULT |
| --- | --- | --- | --- | --- | --- | --- | --- | --- |
| | | | SITE RESIDENCE DEGREE | COOPERATION EASE DEGREE | UPDATE INFLUENCE DEGREE | PRIORITY | | |
| 001 | 201 | 101 | 2 | 1 | 2 | 1 | | MAIN SERVER |
| 002 | 202 | 102 | 3 | 2 | 4 | 2 | | SUB SERVER |
| ... | ... | ... | ... | ... | ... | ... | | ... |

INFORMATION PROCESSING DEVICE, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2017-50260, filed on Mar. 15, 2017, the entire contents of which are incorporated herein by reference.

FIELD

The embodiments discussed herein are related to an information processing device, an information processing system, and an information processing method.

BACKGROUND

In a related art, a technology is known by which a server that has become unavailable is switched to another server (for example, see Japanese Laid-open Patent Publication No. 2010-098713, Japanese Laid-open Patent Publication No. 2000-324121, Japanese Laid-open Patent Publication No. 07-056838, and Japanese Laid-open Patent Publication No. 2000-099435).

In addition, a technology is known in which an access point (AP) of a wireless local area network (LAN) or the like communicates with a further AP, the MAC address of which has been registered in advance, when an advertisement from the further AP has been detected. Such a technology is called a wireless distribution system (WDS) or the like.

The inventors of the technology discussed herein consider that, by using the above-described technologies and the like, for example, a network including a single main server is constituted by two or more vehicles and the like each having a server computer and an AP, which are collected at a specific site, to share data such as an image between server computers.

In this case, when a vehicle or the like in which a server computer selected as a main server is installed is moved from the specific site, a problem occurs in which stable communication is not available.

Therefore, an object according to an aspect of an embodiment is to provide a technology that allows selection of a server by which stable communication is available.

SUMMARY

According to an aspect of the invention, an information processing method executed by a first information processing device which is a candidate of a distribution source of data to a terminal and which moves to be associated with a first wireless access point, the information processing method including: obtaining state information on a second information processing device; determining an information processing device that continuously distributes data to a terminal from among the first information processing device and the second information processing device, in accordance with state information on the first information processing device and the state information on the second information processing device obtained in the obtaining; and distributing data to a terminal through the first wireless access point and a second wireless access point associated with the second information processing device when the first information processing device is determined in the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the technology discussed herein are described below in accordance with drawings.

<Overall Configuration>

Figure 1:
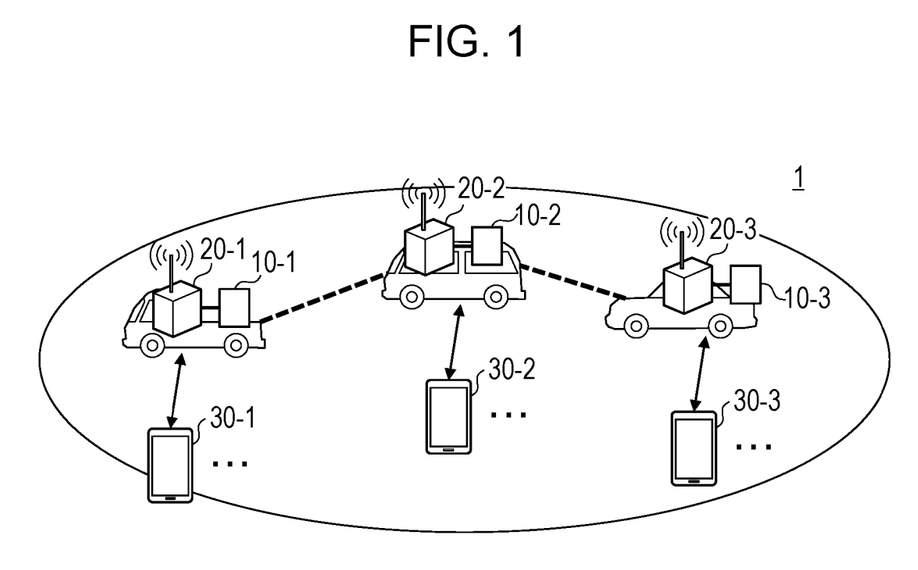
FIG. 1 is a diagram illustrating a configuration example of an information processing system according to an embodiment.

FIG. 1 is a diagram illustrating a configuration example of an information processing system 1 according to an embodiment. In FIG. 1, the information processing system 1 includes information processing devices 10-1, 10-2, 10-3, . . . (hereinafter simply referred to as an "information processing device 10" when it is unnecessary to distinguish the information processing devices), wireless relay devices (wireless access points) 20-1, 20-2, 20-3, . . . (hereinafter simply referred to as a "wireless relay device 20" when it is unnecessary to distinguish the wireless relay devices), and terminals 30-1, 30-2, 30-3, . . . (hereinafter simply referred to as a "terminal 30" when it is unnecessary to distinguish the terminals).

The information processing device 10 is a server device that operates a server program, and may be, for example, a server personal computer (PC), a desktop PC, a laptop PC, a tablet-type terminal, a smartphone, or the like.

The wireless relay device 20 is, for example, a wireless LAN access point.

The terminal 30 is, for example, a smartphone, a tablet-type terminal, a laptop PC, or the like.

The information processing device 10-1 is associated with the wireless relay device 20-1, and is installed, for example, in a police car, a fire engine, an ambulance, or the like. The information processing device 10-1 is coupled to the wireless relay device 20-1, for example, through a LAN cable or the like. The information processing device 10-2, . . . and the corresponding wireless relay device 20-2, . . . have similar configurations. The information processing device 10 and the corresponding wireless relay device 20 may be configured as an integrated device and carried by a user.

The wireless relay devices 20 are coupled to each other, for example, through wireless communication by using the WDS or the like.

The terminal 30 and the corresponding wireless relay device 20 are coupled to each other, for example, through a short-range wireless communication such as a wireless LAN.

When the information processing device 10-1 communicates with other information processing devices 10, a single information processing device 10 that operates as a main server is determined. In addition, the information processing device 10 determined to be the main server stores pieces of data received from the terminals 30 and distributes stored data in response to a request from each of the terminals 30. As a result, pieces of information are aggregated into the single server, and therefore, processing of data synchronization with the other servers in real time becomes unnecessary.

When the terminal 30 enters a specific site, the terminal 30 may obtain, from a specific server, an application for information sharing, which is allowed to be used at the specific site. In addition, when a terminal 30 has a failure in a communication with the main server, the terminal 30 notifies, of the failure in the communication with the main server, a corresponding information processing device 10 wired-coupled to a corresponding wireless relay device 20 to which the terminal 30 is wirelessly coupled. In this case, for example, the terminal 30 obtains a BSSID from an advertise signal of the wireless LAN, which has been received from the wireless relay device 20, and notifies, of the failure, an information processing device having a communication address stored to be associated with the BSSID.

<Hardware Configuration>

Figure 2:
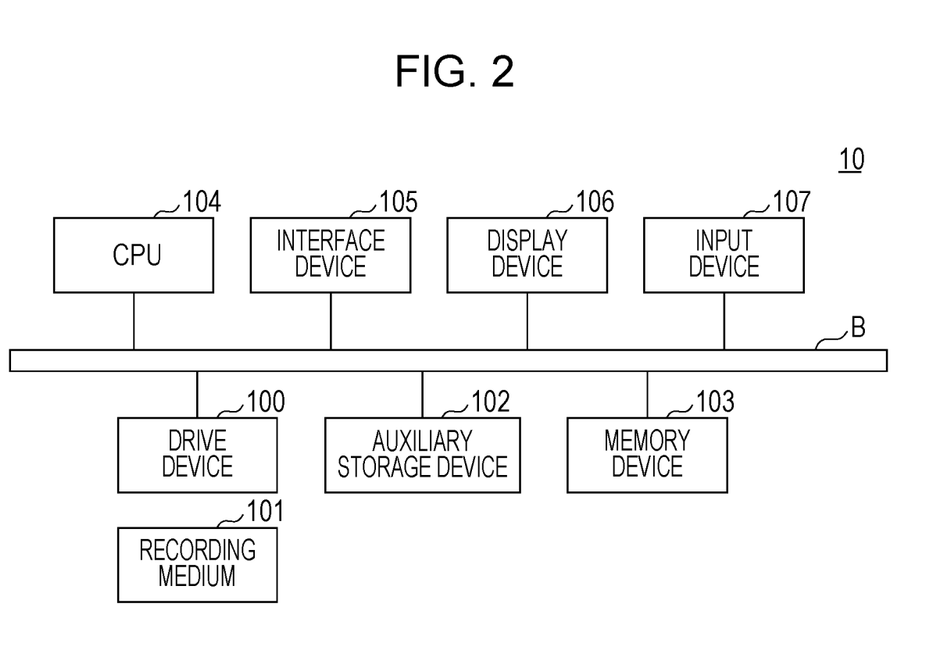
FIG. 2 is a diagram illustrating a hardware configuration example of an information processing device according to the embodiment.

FIG. 2 is a diagram illustrating a hardware configuration example of the information processing device 10 according to the embodiment. The information processing devices 10 in FIG. 2 includes a drive device 100, an auxiliary storage device 102, a memory device 103, a central processing unit (CPU) 104, an interface device 105, a display device 106, and an input device 107 that are coupled to each other through a bus B.

An information processing program that realizes processing in the information processing device 10 is provided through a recording medium 101. When the recording medium 101 in which the information processing program has been recorded is set to the drive device 100, the information processing program is installed to the auxiliary storage device 102 from the recording medium 101 through the drive device 100. However, the information processing program may not be installed from the recording medium 101, and may be downloaded from another computer through a network. The auxiliary storage device 102 stores the installed information processing program, and also stores desired file, data, and the like.

When the memory device 103 receives a program start instruction, the memory device 103 reads the program from the auxiliary storage device 102 and stores the program. The CPU 104 realizes a function of the information processing device 10 in accordance with the program stored in the memory device 103. The interface device 105 is used as an interface to couple the information processing devices 10 to the network. The display device 106 displays a graphical user interface (GUI) and the like by the program. The input device 107 includes a touch panel and a button and is used to input various operation instructions to the information processing device 10.

Examples of the recording medium 101 include a portable recording medium such as a compact disc-read-only memory (CD-ROM), a digital versatile disc (DVD), or a universal serial bus (USB) memory. In addition, examples of the auxiliary storage device 102 include a hard disk drive (HDD) and a flash memory. Each of the recording medium 101 and the auxiliary storage device 102 corresponds to a computer-readable recording medium.

<Functional Configuration>

Figure 3:
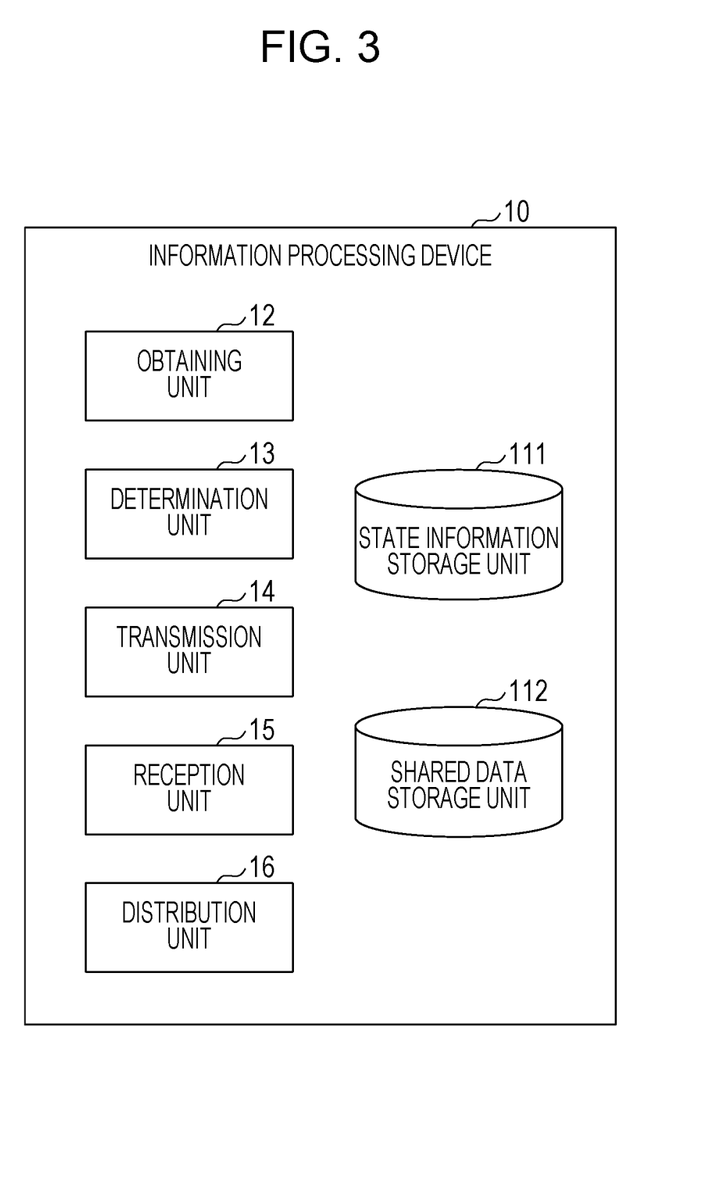
FIG. 3 is a diagram illustrating a functional block example of the information processing device according to the embodiment.

Next, a functional configuration of the information processing device 10 is described with reference to FIG. 3. FIG. 3 is a diagram illustrating an example of the functional block of the information processing device 10 according to the embodiment. The information processing device 10 includes an obtaining unit 12, a determination unit 13, a transmission unit 14, a reception unit 15, and a distribution unit 16. These units are realized by processing in which one or more programs installed in the information processing device 10 cause the CPU 104 of the information processing device 10 to execute.

The obtaining unit 12 obtains information indicating the state of the information processing device 10-1 to which the obtaining unit 12 belongs and pieces of information respectively indicating the states of the other information processing devices 10 with which the information processing device 10-1 communicates.

The determination unit 13 determines a main server that continuously distributes data to the terminals 30 from among the information processing device 10-1 and the other information processing devices 10 with which the information processing device 10-1 communicates, in accordance with the states obtained by the obtaining unit 12.

The transmission unit 14 transmits the result determined by the determination unit 13 to the other information processing devices 10.

The reception unit 15 receives data from the other information processing devices 10.

When the information processing device 10-1 is determined to be a main server by the determination unit 13, the distribution unit 16 stores pieces of data received from the terminals 30 in a shared data storage unit 112 described later and distributes pieces of data stored in the shared data storage unit 112 to the terminals 30. Here, when the terminal 30-2 is wirelessly coupled to, for example, the wireless access point 20-2 associated with the information processing device 10-2, the distribution unit 16 distributes data to the terminal 30-2 through the wireless access point 20-1 associated with the information processing device 10-1 and the wireless access point 20-2.

When the information processing device 10-1 is not determined to be a main server by the determination unit 13, the distribution unit 16 backs up data stored in the main server to the shared data storage unit 112.

In addition, the information processing device 10 includes a state information storage unit 111 and the shared data storage unit 112. Each of the storage units 111 and 112 is realized, for example, by the auxiliary storage device 102 or the like. Data stored in the state information storage unit 111 is described later.

In the shared data storage unit 112, data shared between the terminals 30 at a specific site is stored.

<Processing>

Figure 4:
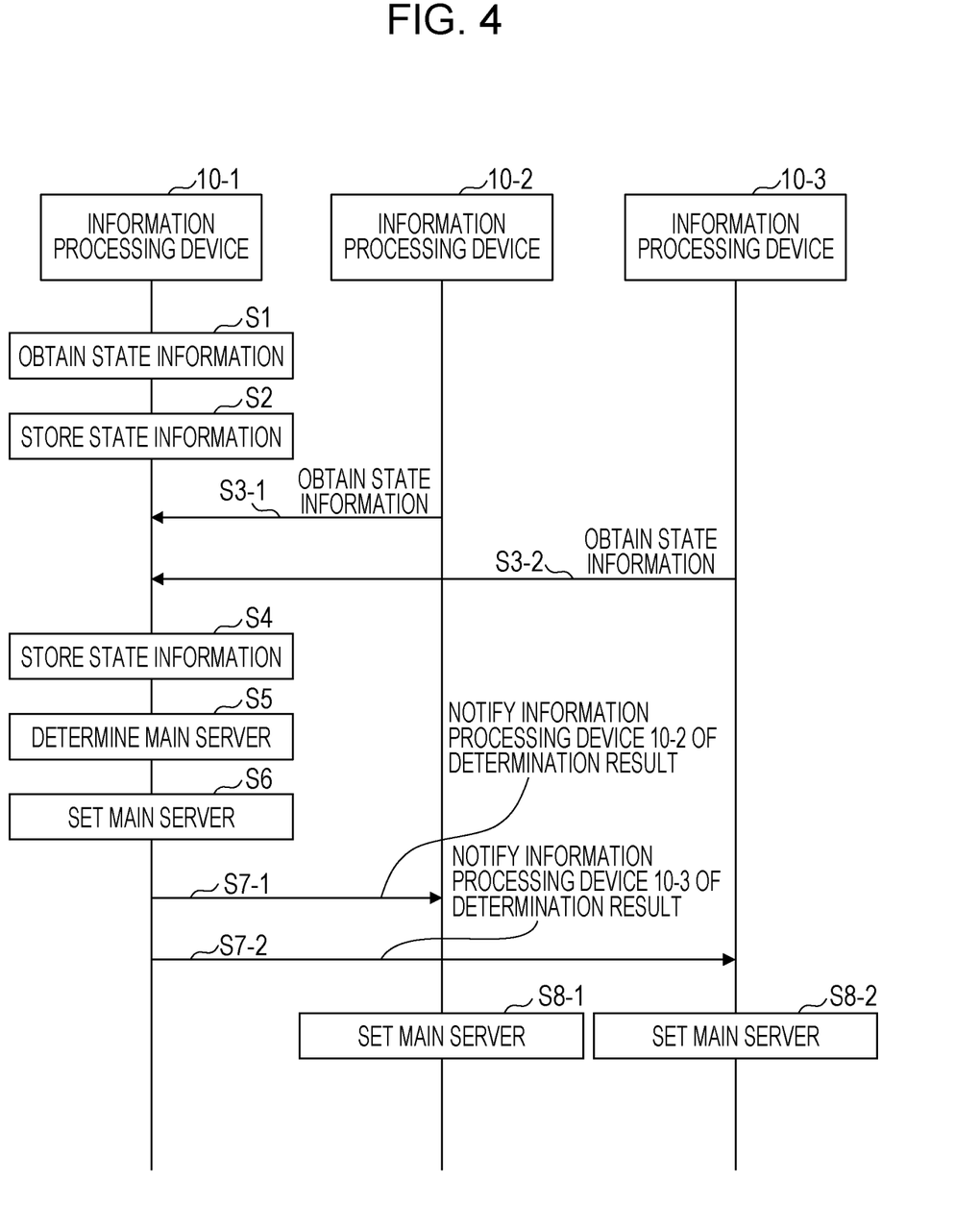
FIG. 4 is a sequence diagram illustrating an example of processing of the information processing system according to the embodiment.

The processing of the information processing system 1 is described below with reference to FIG. 4. FIG. 4 is a sequence diagram illustrating an example of the processing of the information processing system 1 according to the embodiment.

Here, it is assumed that the wireless relay devices 20-1, 20-2, and 20-3 are wirelessly coupled to each other, and a communication is established between the information processing devices 10-1, 10-2, and 10-3.

The following processing may be executed, for example, periodically, or may be executed when state information described later is changed due to a departure of a vehicle from a specific site (site) or an arrival of a vehicle at the site. Alternatively, the processing may be executed when a failure in a communication with a main server is notified from the terminal 30, may be executed when a failure in a communication of the main server is detected by periodical vital monitoring of the main server, or may be executed in response to a specific operation from the user.

In addition, the following processing may be executed, for example, in the information processing device 10-1 to which the highest priority described later has been set, from among the information processing devices 10-1, 10-2, and 10-3.

In Step S1, the obtaining unit 12 of the information processing device 10-1 obtains state information on the information processing device 10-1.

Next, the obtaining unit 12 of the information processing device 10-1 stores the obtained state information in the state information storage unit 111 (Step S2).

Figure 5:
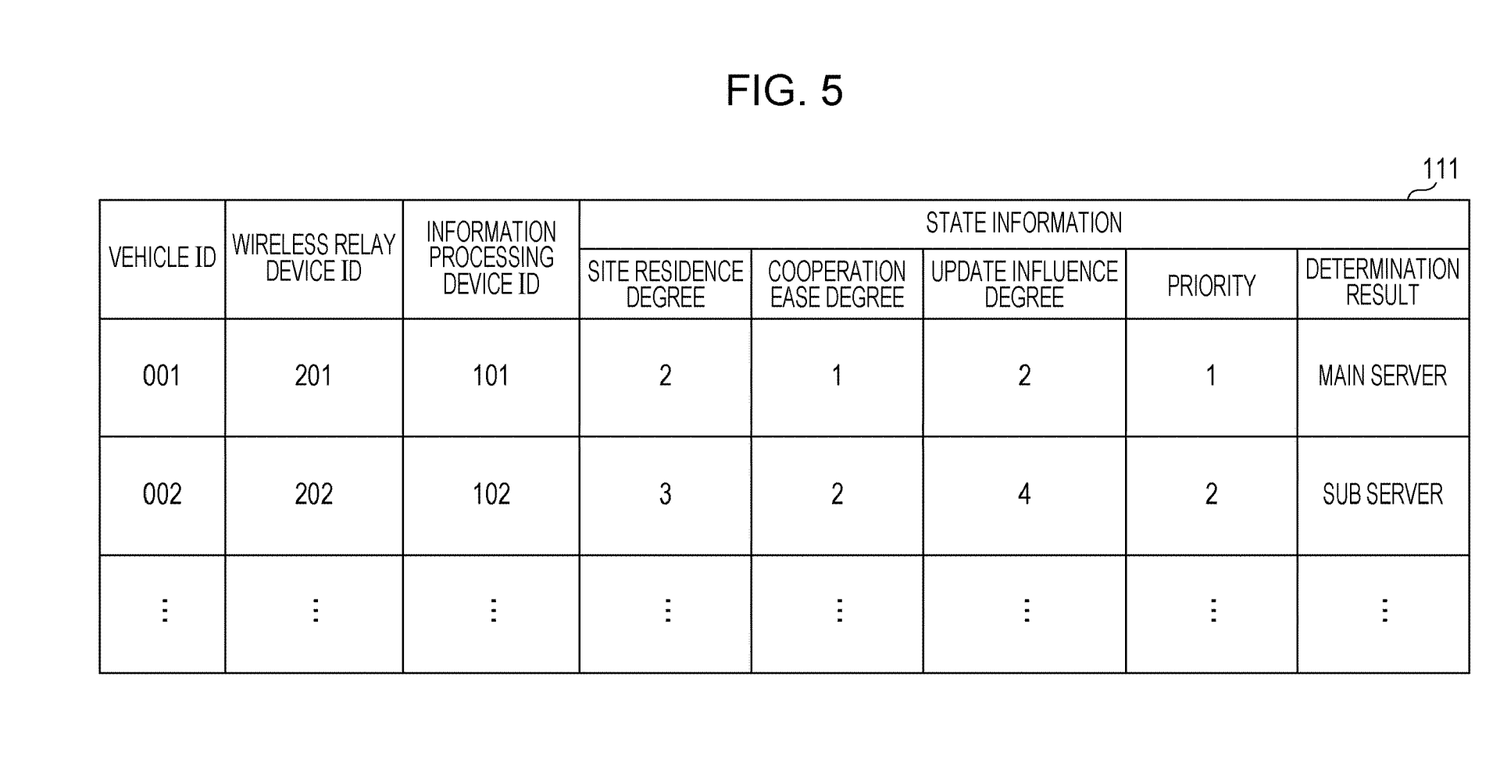
FIG. 5 is a diagram illustrating an example of data stored in a state information storage unit.

FIG. 5 is a diagram illustrating an example of data stored in the state information storage unit 111. In the state information storage unit 111, a vehicle ID, a wireless relay device ID, an information processing device ID, and state information are stored to be associated with each other. The vehicle ID is an identification information (ID) on a vehicle in which a pair of the information processing device 10 and the wireless relay device 20 is installed. The wireless relay device ID is an ID of the wireless relay device 20, and may be, for example, a communication address such as a MAC address. The information processing device ID is an ID of the information processing device 10, and may be, for example, a communication address such as an IP address.

The state information is information indicating the state of the information processing device 10, and includes a site residence degree, a cooperation ease degree, an update influence degree, a priority, and a determination result.

The site residence degree is an index indicating a degree in which the information processing device 10 is expected to stay long at the site, and is calculated in accordance with vehicle movement frequency, an attribute of a vehicle or an on-site response staff, a communication duration time, a site residence time, and the like.

The vehicle movement frequency includes frequency of a departure of the vehicle from the site (range in which data is allowed to be distributed by the distribution unit 16), and frequency of movement at the site. The vehicle movement frequency may be determined, for example, in accordance with a change in the current position obtained from a global positioning system (GPS) and travel information obtained from an engine control unit (ECU) of the vehicle. When the state information indicates that the vehicle movement frequency is low, such an information processing device 10 is determined to be suitable for a main server.

The attribute of the vehicle or the on-site response staff is, for example, information indicating whether the vehicle is a commander vehicle or information indicating whether the on-site response staff is a commander. When the state information indicates that the vehicle is a commander vehicle or the on-site response staff is the commander, such an information processing device 10 is determined to be suitable for a main server.

The communication duration time is a time period in which a communication with another information processing device at the site has been established.

The site residence time is a time period in which the information processing device 10 has stayed at the site. Whether the information processing device 10 stays at the site may be determined, for example, in accordance with the current position obtained from the GPS or the travel information obtained from the ECU of the vehicle.

The cooperation ease degree is an index indicating a degree of ease of cooperation with the other information processing devices 10, and is calculated in accordance with wireless radio wave statuses with the other vehicles, surrounding radio wave noise status, physical distances with the other vehicles, and the like.

The wireless radio wave statuses with the other vehicles respectively indicate the strengths of wireless radio waves received from the wireless relay devices 20 installed in the other vehicles at the site. For example, when the state information indicates that the number of wireless relay devices 20 from each of which a wireless radio wave is strong increases, such an information processing device 10 is determined to be suitable for a main server.

The surrounding radio wave noise status indicates the strength of a wireless radio wave received from devices other than the wireless relay devices 20 installed in the other vehicles at the site. When the state information indicates that the radio wave strength is weak, such an information processing device 10 is determined to be suitable for a main server.

The physical distances with the other vehicles are distances with the other vehicles at the site, and may be calculated, for example, in accordance with the current positions of the vehicles obtained from the GPS. When the state information indicates that the physical distances with the other vehicles are small, such an information processing device 10 is determined to be suitable for a main server.

The update influence degree is an index indicating an influence degree when the information processing device 10 is selected as a main server, and is calculated in accordance with the number of wirelessly-coupled terminals, the number of terminals coupled to the main server, the number of information processing devices, an accumulated data amount, and the like.

The number of wirelessly-coupled terminals indicates the number of terminals 30 wirelessly coupled to the wireless relay device 20 coupled to the information processing device 10 by a wire. When the state information indicates that the number of wirelessly-coupled terminals becomes larger, such an information processing device 10 is determined to be suitable for a main server.

The number of terminals coupled to the main server indicates the number of terminals currently coupled to the main server. For example, in a case in which sites each including a main server are integrated, when the state information indicates that the number of terminals coupled to the main server becomes large, such an information processing device 10 is determined to be suitable for a main server.

The number of information processing devices indicates the number of information processing devices 10 coupled to a network established at the site. For example, in a case in which sites each including a main server are integrated, when the state information indicates that the number of information processing devices becomes large, such an information processing device 10 is determined to be suitable for a main server.

The accumulated data amount is a size of data shared at the site. When the state information indicates that the size of the accumulated data amount becomes larger, such an information processing device 10 is determined to be suitable for a main server.

As the update influence degree, a battery remaining amount, a hardware exhaustion degree, and the like of the information processing device 10 may be stored. In addition, for the site residence degree, the cooperation ease degree, or the update influence degree, the average value or the like may be used in accordance with the previous statistical information.

The priority is a priority set in advance. When the state information indicates that the priority becomes high, such an information processing device 10 is determined to be suitable for a main server.

The determination result indicates a result of processing in which the previous main server is determined, and is information indicating whether the information processing device 10-1 is a main server.

Here, a vehicle ID, a wireless relay device ID, and an information processing device ID that are associated with the information processing device 10-1 may be set to the information processing device 10-1 in advance.

Next, the obtaining unit 12 of the information processing device 10-1 obtains pieces of state information on the information processing devices 10-2 and 10-3 (Step S3-1, Step S3-2).

Next, the pieces of state information of the information processing devices 10-2 and 10-3 obtained by the obtaining unit 12 of the information processing device 10-1 are stored in the state information storage unit 111 (Step S4).

Next, the determination unit 13 of the information processing device 10-1 executes processing in which a main server is determined (Step S5).

Next, the distribution unit 16 of the information processing device 10-1 executes processing in which a main server is set in accordance with the determination result (Step S6). Here, the information processing device 10-1 notifies the terminal 30 wirelessly coupled to (accommodated in) the wireless relay device 20-1 installed in the same vehicle with the information processing device 10-1, of an ID of the information processing device 10 determined to be the main server.

Next, the transmission unit 14 of the information processing device 10-1 notifies the information processing devices 10-2 and 10-3 of the determination results (Step S7-1 and Step S7-2).

Next, the distribution unit 16 of each of the information processing devices 10-2 and 10-3 executes processing in which the main server is set in accordance with the notified determination result (Step S8-1 and Step S8-2).

<Main Server Determination Processing>

Figure 6:
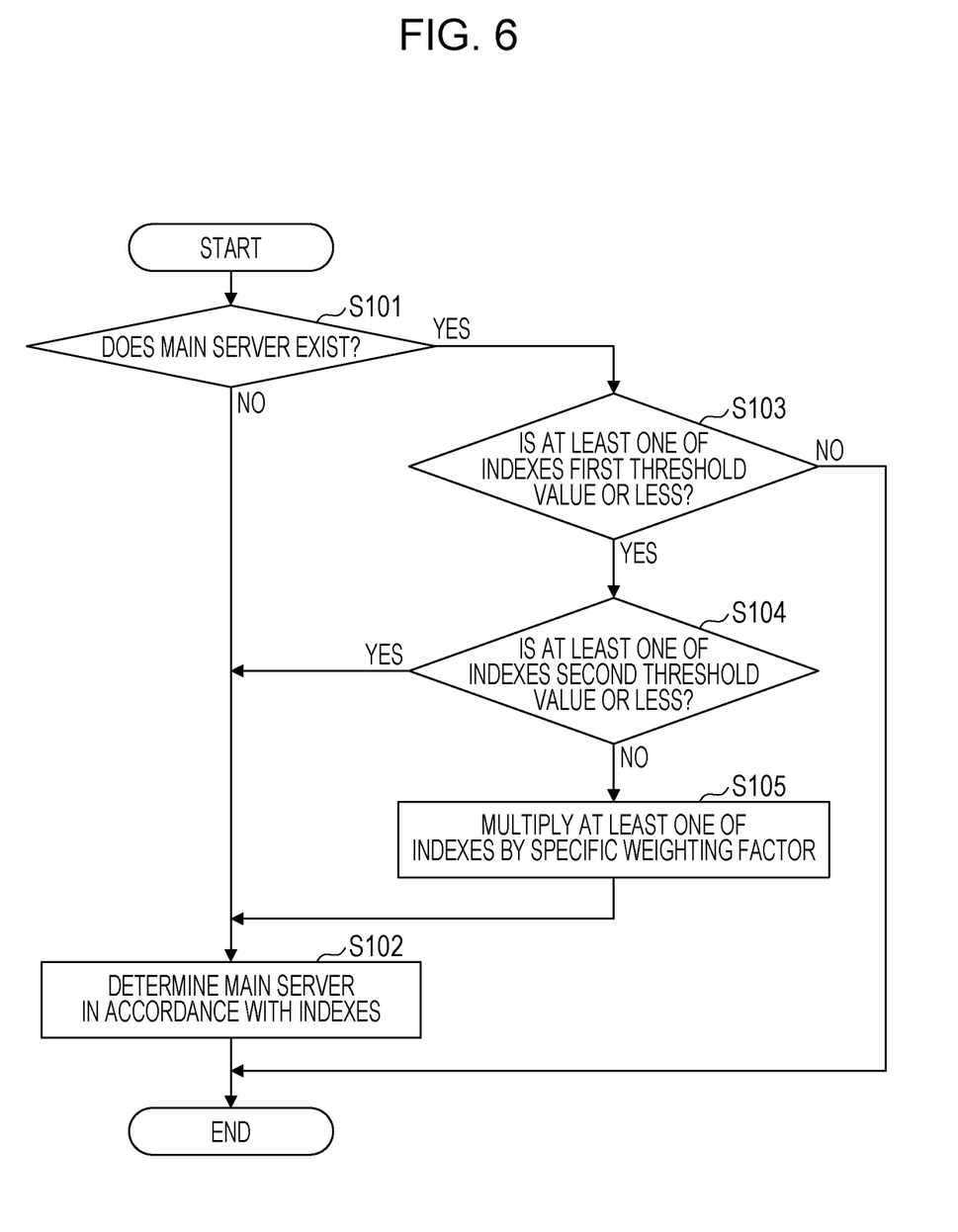
FIG. 6 is a flowchart illustrating an example of processing in which a main server is determined.

The processing in which a main server is determined by the determination unit 13 in Step S5 is described below with reference to FIG. 6. FIG. 6 is a flowchart illustrating an example of the processing in which a main server is determined.

In Step S101, the determination unit 13 determines whether an information processing device 10 that is a "main server" exists, in accordance with the determination result of the state information storage unit 111 illustrated in FIG. 5.

When an information processing device 10 that is a "main server" does not exist (NO in Step S101), the determination unit 13 determines a "main server" in accordance with the indexes such as a site residence degree, a cooperation ease degree, an update influence degree, and a priority (Step S102), and the processing ends. Here, for example, the determination unit 13 determines an information processing device 10 having the smallest (excellent) total value of the indexes to be a "main server".

When an information processing device 10 that is a "main server" exists (YES in Step S101), the determination unit 13 determines whether at least one of the indexes such as the site residence degree, the cooperation ease degree, and the update influence degree of the information processing device 10 is a first threshold value or less (Step S103).

When all of the indexes of the information processing device 10 are more than the first threshold value (NO in Step S103), the processing ends.

When at least one of the indexes of the information processing device 10 is the first threshold value or less (YES in Step S103), the determination unit 13 determines whether at least one of the indexes such as the site residence degree, the cooperation ease degree, and the update influence degree of the information processing device 10 is a second threshold value or less, which is larger than the first threshold value (Step S104).

When at least one of the indexes of the information processing device 10 is the second threshold value or less (YES in Step S104), the processing proceeds to Step S102.

When all of the indexes of the information processing device 10 are more than the second threshold value (NO in Step S104), the determination unit 13 multiplies at least one of the indexes such as the site residence degree, the cooperation ease degree, and the update influence degree of the information processing device 10 by a specific weighting factor (Step S105), and the processing proceeds to Step S102. Here, when at least one of the indexes of the information processing device 10 is multiplied by the specific weighting factor, whether the information processing device 10 is a "main server" is easily determined in Step S102.

CONCLUSION

In the related arts, there is a problem that a vehicle or the like in which a server computer selected as a main server is installed does not provide stable communication when the vehicle moves from a specific site. As a specific example, when a vehicle or the like that plays the role of a main server moves to a location in which it is difficult for the vehicle to provide wireless communication with a group of the other vehicles, a communication for the entire data sharing is disconnected frequently, thereby reducing efficiency of sharing of data such as images. In addition, the network is established by two or more freely-movable vehicles and the like, and therefore, such a network configuration is changed frequently, and it is difficult to predict such a change in the network configuration in advance. Therefore, a vehicle that plays the role of a main server is switched frequently, and reconnection frequently occurs between a newly-selected main server, the other servers, information terminal devices, and the like, such that efficiency of the entire data sharing is reduced.

In the above-described embodiments, an information processing device that continuously distributes pieces of data to terminals is determined from among a first information processing device and a second information processing device in accordance with state information of the first information processing device and state information of the second information processing device. As a result, a server that performs a stable communication may be selected. The selection of a server that performs a stable communication includes selection of a server in which the entire data sharing is continued for a long time without frequent switching of a server that plays a role of a main server in addition to selection of a server that performs a stable communication with two or more vehicles and the like.

The embodiments of the technology discussed herein are described above in detail, but the technology discussed herein is not limited to such specific embodiments, and various modifications and changes may be made within the scope of the gist of the technology discussed herein.

The function units of the information processing device 10 may be realized by cloud computing constituted, for example, by one or more computers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first information processing device which is a candidate of a distribution source of data to a terminal and which moves to be associated with a first wireless access point, the first information processing device comprising:
    a memory, and
    a processor coupled to the memory and configured to execute a process comprising:
    obtaining state information on a second information processing device;
    determining an information processing device that continuously distributes data to the terminal from among the first information processing device and the second information processing device, in accordance with state information on the first information processing device and the state information on the second information processing device obtained in the obtaining; and
    distributing data to the terminal through the first wireless access point and a second wireless access point associated with the second information processing device when the first information processing device is determined in the determining.

2. The first information processing device according to claim 1,
    each of the state information on the first information processing device and the state information on the second information processing device includes movement frequency of the respective information processing device.

3. The first information processing device according to claim 2,
    the movement frequency includes frequency of a departure from a range in which data is allowed to be distributed by the distributing or frequency of movement of the respective information processing device within the range in which data is allowed to be distributed by the distributing.

4. The first information processing device according to claim 1,
    each of the state information includes at least one of an attribute of a vehicle in which the respective information processing device is installed, an attribute of a user in the vehicle, a communication duration time in which the data is allowed to be distributed by the distributing, and a site residence time in which the vehicle stays in a range in which data is allowed to be distributed by the distributing.

5. The first information processing device according to claim 1,
    each of the state information includes at least one of wireless radio wave status with other information processing device, surrounding radio wave noise status, physical distance between the respective information processing device and the other information processing device.

6. The first information processing device according to claim 1,
    each of the state information includes at least one of a number of terminals wirelessly connected to the wireless access point associated with the respective information processing device, a number of terminals wirelessly connected to the determined information processing device in the determining, a number of candidate information processing devices, and an amount of data to be distributed.

7. The first information processing device according to claim 1, wherein the process further comprising:
    transmitting, to the second information processing device, a notice of departure from a range in which data is allowed to be distributed by the distributing when the first information processing device departs from the range.

8. The first information processing device according to claim 1, wherein the process further comprising:
    receiving, from the terminal connected to the first wireless access point, a notice of a failure of communication with the information processing device determined in the determining.

9. An information processing system comprising:
    a first information device which is a candidate of a distribution source of data to a terminal and which moves to be associated with a first wireless access point,
    a second information device which moves to be associated with a second wireless access point,
    a memory and
    a processor coupled to the memory and configured to execute a process comprising:
    obtaining state information on the first information processing device and the second information processing device;
    determining an information processing device that continuously distributes data to the terminal from among the first information processing device and the second information processing device, in accordance with the state information on the first information processing device and the state information on the second information processing device obtained in the obtaining; and
    distributing data to the terminal through the first wireless access point and the second wireless access point when the first information processing device is determined in the determining.

10. An information processing method executed by a first information processing device which is a candidate of a distribution source of data to a terminal and which moves to be associated with a first wireless access point, the information processing method comprising:
    obtaining state information on a second information processing device;

determining an information processing device that continuously distributes data to the terminal from among the first information processing device and the second information processing device, in accordance with state information on the first information processing device and the state information on the second information processing device obtained in the obtaining; and distributing data to the terminal through the first wireless access point and a second wireless access point associated with the second information processing device when the first information processing device is determined in the determining.

* * * * *